(12) United States Patent
Slamka

(10) Patent No.: US 11,064,226 B2
(45) Date of Patent: Jul. 13, 2021

(54) SYSTEM AND METHOD FOR CONCURRENT DATA STREAMS FROM A SINGULAR SENSOR WITH REMOTELY SELECTABLE PARAMETERS

(71) Applicant: Echo-Sense, Inc., Camas, WA (US)

(72) Inventor: Milan Slamka, Camas, WA (US)

(73) Assignee: Echo-Sense, Inc., Camas, WA (US)

( * ) Notice: Subject to any disclaimer, the term of this patent is extended or adjusted under 35 U.S.C. 154(b) by 0 days.

(21) Appl. No.: 15/922,614

(22) Filed: Mar. 15, 2018

(65) Prior Publication Data
US 2018/0270514 A1    Sep. 20, 2018

Related U.S. Application Data

(60) Provisional application No. 62/472,148, filed on Mar. 16, 2017.

(51) Int. Cl.
| | |
|---|---|
| H04N 21/2343 | (2011.01) |
| H04N 21/2365 | (2011.01) |
| H04L 29/06 | (2006.01) |
| H04N 7/18 | (2006.01) |
| G02C 11/00 | (2006.01) |
| H04W 4/80 | (2018.01) |
| H04W 4/06 | (2009.01) |

(52) U.S. Cl.
CPC ..... *H04N 21/23439* (2013.01); *H04L 65/602* (2013.01); *H04L 65/80* (2013.01); *H04N 7/18* (2013.01); *H04N 21/2365* (2013.01); *G02C 11/10* (2013.01); *H04W 4/06* (2013.01); *H04W 4/80* (2018.02)

(58) Field of Classification Search
CPC ............ H04L 65/602; H04N 21/23439; H04N 21/2365; H04W 4/80
See application file for complete search history.

(56) References Cited

U.S. PATENT DOCUMENTS

| | | | |
|---|---|---|---|
| 7,050,994 B1 * | 5/2006 | McIntyre | G03B 17/48 705/26.41 |
| 8,190,674 B2 * | 5/2012 | Narayanan | H04L 65/60 709/203 |
| 8,970,654 B1 * | 3/2015 | Johnson | G06K 9/00711 348/14.07 |
| 10,397,376 B2 * | 8/2019 | Phillips | H04L 65/60 |
| 2006/0007344 A1 * | 1/2006 | Neufeld | H04N 5/2251 348/336 |
| 2008/0025387 A1 * | 1/2008 | Lim | H04N 7/185 375/240.01 |
| 2009/0085740 A1 * | 4/2009 | Klein | H04N 21/2662 340/540 |

(Continued)

*Primary Examiner* — Mohamed A. Wasel
(74) *Attorney, Agent, or Firm* — FisherBroyles LLP; Kevin D. Jablonski

(57) ABSTRACT

A system and method for concurrently streaming audio and video data in different qualities through a single input signal is provided. Audio and video data are captured for monitoring at a selectable rate set by a remote computing device. The captured A/V data is stored in a local memory as a local data stream with a high definition and may be streamed locally at a high rate. Simultaneously, the captured A/V data is manipulated in different (lower) quality for transmission as a remote data stream based on remote instructions. The local data stream is also streamed to the remote computing device.

19 Claims, 9 Drawing Sheets

(56) References Cited

U.S. PATENT DOCUMENTS

| | | | | |
|---|---|---|---|---|
| 2012/0300076 A1* | 11/2012 | Aimura | ................... | B60R 1/00 |
| | | | | 348/148 |
| 2013/0135427 A1* | 5/2013 | Wu | ................. | H04N 21/23655 |
| | | | | 348/14.09 |
| 2014/0137162 A1* | 5/2014 | McNamee | ......... | H04N 21/2368 |
| | | | | 725/63 |
| 2015/0312535 A1* | 10/2015 | Borger | .................. | G08B 25/14 |
| | | | | 386/228 |
| 2016/0066085 A1* | 3/2016 | Chang | ..................... | H04R 3/00 |
| | | | | 381/122 |
| 2016/0292511 A1* | 10/2016 | Ayalasomayajula | ........................ | |
| | | | | G06K 9/00751 |
| 2016/0364123 A1* | 12/2016 | Burns | .................... | G06F 3/0488 |
| 2017/0059265 A1* | 3/2017 | Winter | ............... | H04N 5/23229 |
| 2018/0077437 A1* | 3/2018 | Hansen | ................ | H04N 21/222 |

\* cited by examiner

SYSTEM AND METHOD FOR CONCURRENT DATA STREAMS FROM A SINGULAR SENSOR WITH REMOTELY SELECTABLE PARAMETERS

PRIORITY CLAIM TO RELATED PROVISIONAL APPLICATION

The present application claims priority and benefit from the U.S. Provisional Patent Application No. 62/472,148, filed Mar. 16, 2017 and titled, "SYSTEM AND METHOD FOR CONCURRENT DATA STREAMS FROM A SINGULAR SENSOR WITH REMOTELY SELECTABLE PARAMETERS". The entire content of the provisional application is herein expressly incorporated herein by reference.

CROSS REFERENCES TO RELATED APPLICATIONS

The present application is related to a commonly-assigned U.S. patent application Ser. No. 15/922,627, entitled "SYSTEM TO OVERCOME THE TWO-DIMENSIONAL NATURE OF THE CAPTURED IMAGES WHEN ATTEMPTING TO GENERATE THREE-DIMENSIONAL MEASUREMENT DATA" filed on Mar. 15, 2018, the disclosures of which are incorporated herein by reference.

BACKGROUND

There are many situations in which one person depends on another to gather information and report back findings. For instance, law enforcement officers, soldiers, and the like, can communicate and discover information in this manner. Specifically, a chief officer often sends out lower ranking officers into the field to investigate scenes of an accident or crime, interrogate witnesses, etc., and upon returning to the chief officer, the lower ranking officers can communicate the information back to the chief officer. However, gathering information in this word-of-mouth fashion can be time consuming. Also, the lower ranking officer may not notice certain details while on the fact-finding mission. Furthermore, the lower ranking officer might forget certain facts before reporting to the chief officer. Additionally, the chief officer may not sufficiently comprehend the situations encountered by the lower ranking officers even after hearing all of the details.

Also, communicating information from the chief officer to the lower ranking officers can be burdensome. For instance, in some instances, the chief officer can only communicate with the lower ranking officer after the fact-finding mission is over. As such, the chief may not be able to relay important information to the lower ranking officer at crucial times, and the investigation can be hindered as a result. Further, there is no system capable of real-time monitoring or real-time command and control.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
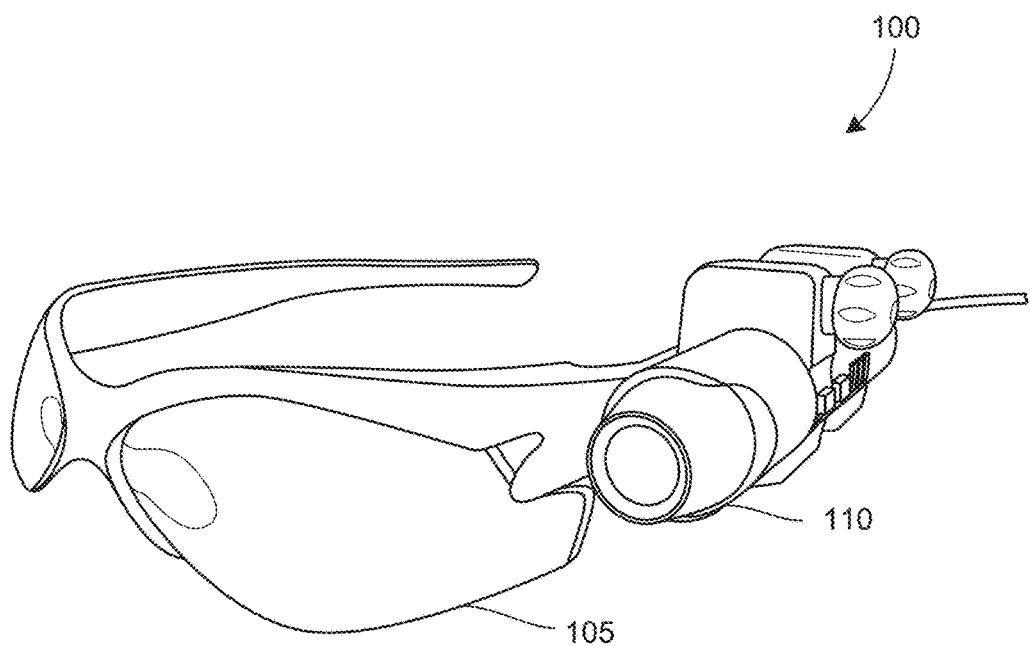
FIG. 1 is a schematic illustration of an audio and video capture device and system according to an embodiment of the present disclosure.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Embodiments will be described more fully hereinafter with reference to the accompanying drawings, which form a part hereof, and which show, by way of illustration, exemplary embodiments by which the systems and methods described herein may be practiced. The systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware-implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, or the like) that is part of a client device, server, network element, or other form of computing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Prior to discussing specific details of the embodiments described herein, a brief overview of the subject matter is presented. Generally, one or more embodiments are directed to systems, apparatuses, and methods for concurrently streaming audio and video data in different qualities (e.g., different bit-rates and resolutions). Audio and video data are captured for monitoring at a remote field scout device. The captured A/V data is stored in a local memory as a local data stream with a high definition. The local data stream is locally accessible for users and remotely accessible through various communication channels. Simultaneously, the captured A/V data can be manipulated into different quality formats and served as a remote data stream based on remote instructions thereby transmitted to a remote location. The local high-quality data may also be streamed to the remote computing device.

Such a system is an improvement over conventional systems that can only transmit a single quality of data (e.g., only high-definition video data or only low-definition video data). In this manner, a remote monitor system can set the resolution or bit-depth of the video stream so as to acquire high-definition data during times of high use (e.g., police pursuit and the like) or to low-resolution or bit-depth during times of routine use (e.g., helping a kitty out of a tree). The local memory can still store all captured data at high quality settings, but for routine use, the transmission of the high-quality data can be mitigated to a low-quality version so as to not consume as much bandwidth during data transmissions.

Figure 2:
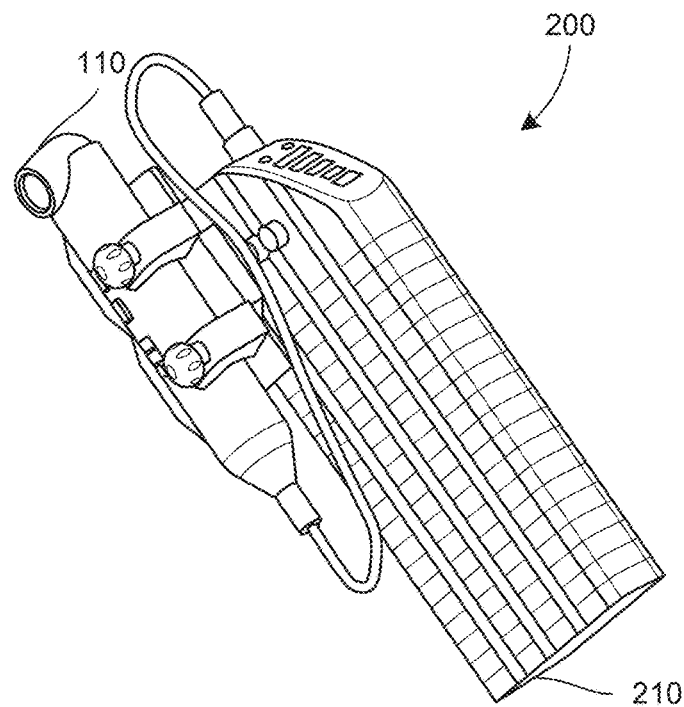
FIG. 2 is a schematic illustration of a docking station for the audio and video capture device and system of FIG. 1 according to an embodiment of the present disclosure.

Referring initially to FIGS. 1 and 2, a device is illustrated according to various exemplary embodiments of the present disclosure. In general, the device provides a means for capturing audio and video recordings in real time and then facilitating the communications of the real-time audio and video signals to a remote location through a docking station (shown in FIG. 2).

FIG. 1 is a schematic illustration of an audio and video capture device 100 (e.g., A/V device or scouting device as used throughout) and system according to an embodiment of the present disclosure. As shown in FIG. 1, the audio/video device 100 can include a camera 110. The camera 110 can gather video images (i.e., moving images or video) or still images (i.e., photographs or pictures). Moreover, the camera 110 can gather video images at any suitable number of frames per minute and at any suitable resolution (e.g., video parameters). In some embodiments, the camera 110 can be a night-vision camera for capturing images in low light levels. Thus, as will be discussed, the camera 110 can gather images of the area surrounding the particular individual such as a police officer or filed scout (i.e. images of the immediate area to the scout).

The audio/video device 100 can also include a transceiver (discussed further below with respect to FIG. 3). The transceiver can provide two-way communication between the scouting device 100 and the monitoring user at a remote location as will be discussed.

The scouting device 100 can further include an input transducer (discussed further below with respect to FIG. 3), such as a microphone, a keyboard, buttons, etc. Information to be transmitted from the scout to the monitoring user can be input by the scout into the input transducer.

In addition, the scouting device 100 can include an output transducer (discussed further below with respect to FIG. 3), such as a speaker, a display, etc. Information received from the monitoring user by the scout can be output to the scout by the output transducer.

The scouting device 100 can additionally include a positioning device (not shown). In some embodiments, the positioning device can be linked to a regional satellite navigation system or a global satellite navigation system, such as GPS (the Global Positioning System), GLONASS, or Galileo, so that the positioning device can automatically detect the position (e.g., latitude and longitude) of the scouting device 100. In some embodiments, the positioning device can also automatically detect and update the position of the device while the device moves. Updating and refreshing of the scout's current position can occur at any predetermined time interval.

Furthermore, the scouting device 100 can include a memory unit (not shown). The memory unit can be a computerized memory unit including RAM, ROM, or other type of memory, and the memory unit can have any suitable capacity. The memory unit may accordingly incorporate either volatile memory or non-volatile memory (such as either NAND or NOR flash memory). In some embodiments, the memory unit can save images gathered by the camera 110 or other information so that the information can be reviewed or transmitted at a later time.

The scouting device 100 may also include at least one power source (not shown), which may supply power to any or all of the parts of the scouting device 100. The power source may be, for example, a lithium ion battery, but in various embodiments the power source may alternatively be one or more of another type of rechargeable battery (such nickel-cadmium batteries), or one or more non-rechargeable batteries (such alkaline batteries). Moreover, in some embodiments, the power source may include an adapter operable to plug in to an electrical outlet. When plugged into an electrical outlet, the power source may supply power to the various parts of the scouting device 100 from a battery, or from the electrical outlet, or from both.

It will be appreciated that the scouting device 100 can be a portable unit. For instance, in some embodiments, at least some components of the scouting device 100 (e.g., the transceiver and/or the transducers) can be incorporated in a cellular telephone or other portable device. The camera 110 can be connected to the cellular telephone via a USB or other type of connector, whether wired or wireless.

In some embodiments, the scouting device 100 may be connected to the cellular telephone by an isochronous USB 2.0 connection, or by another type of isochronous interface. The scouting device 100 can transmit data serially or in parallel. In some embodiments, the scouting device 100 can transmit data both serially and in parallel. For example, the connector may be a high-performance serial bus or high-speed serial interface, such as an IEEE 1394 interface (a.k.a. FireWire), or a SATA (Serial ATA) interface, or a PCI Express interface, a USB 3.0 interface. In other embodiments, the scouting device 100 may transmit data wirelessly, such as by a Bluetooth™ connection.

In addition, in some cases, the scouting device 100 can be such that the camera 110 substantially takes photographs or gathers video images of objects that are in the line of vision of the scout. Additionally, the device may include means for detecting and providing an orientation, such as a magnetometer. For example, the positioning device may include an orientation device, and may thus automatically detect and update both the position and the orientation of the scouting device 100 within the environment. That is, the device may detect a direction (such as a direction on a map) in which camera is pointing. The scouting device 100 may thereby detect the direction of the line of vision of the scout.

However, it will be appreciated that the scouting device 100 could be incorporated into any suitable portable unit, and that the camera could be mounted to any other portion of the scout's body or belongings. For example, the scouting device 100 can be mounted onto glasses 105, or some other areas, including hat, helmet, collar, epaulette or chest of an officer. The scouting device 100 can rotate and secure onto the officer with various means, including clips or other secured attachments. In additional embodiments, the camera 110 can be removably mounted to the scout's body or belongings (e.g., a clip-on camera that removably clips onto the scout's body or belongings).

Accordingly, parts of the scouting device 100—such as the camera 110, the transceiver, the input transducer, the output transducer, the positioning device, the memory unit, and the power source—may be integrated with each other in a variety of ways. For example, one or more of the camera, the input transducer, and the output transducer may be operably secured within or incorporated in a removable head-mounted device such as a pair of glasses or sunglasses 105.

Similarly, one or more of the positioning device, the memory unit, the power source, and the transceiver may be incorporated in a portable unit or device, such as a cellular telephone. In some configurations, the transceiver may be incorporated in a cellular telephone, while other parts of the scouting device 100 (such as the camera, the transceiver, the input transducer, and the output transducer) may be integrated with each other outside of the cellular telephone. In other configurations, some parts of the scouting device 100, such as the input transducer and the output transducer, may be partially incorporated in a removable head-mounted device, and partially incorporated in a portable unit or device. FIG. 2 is a schematic illustration of a docking station 210 for the audio and video capture device and system of FIG. 1 according to an embodiment of the present disclosure. (discussed further below with respect to FIG. 4)

Figure 3:
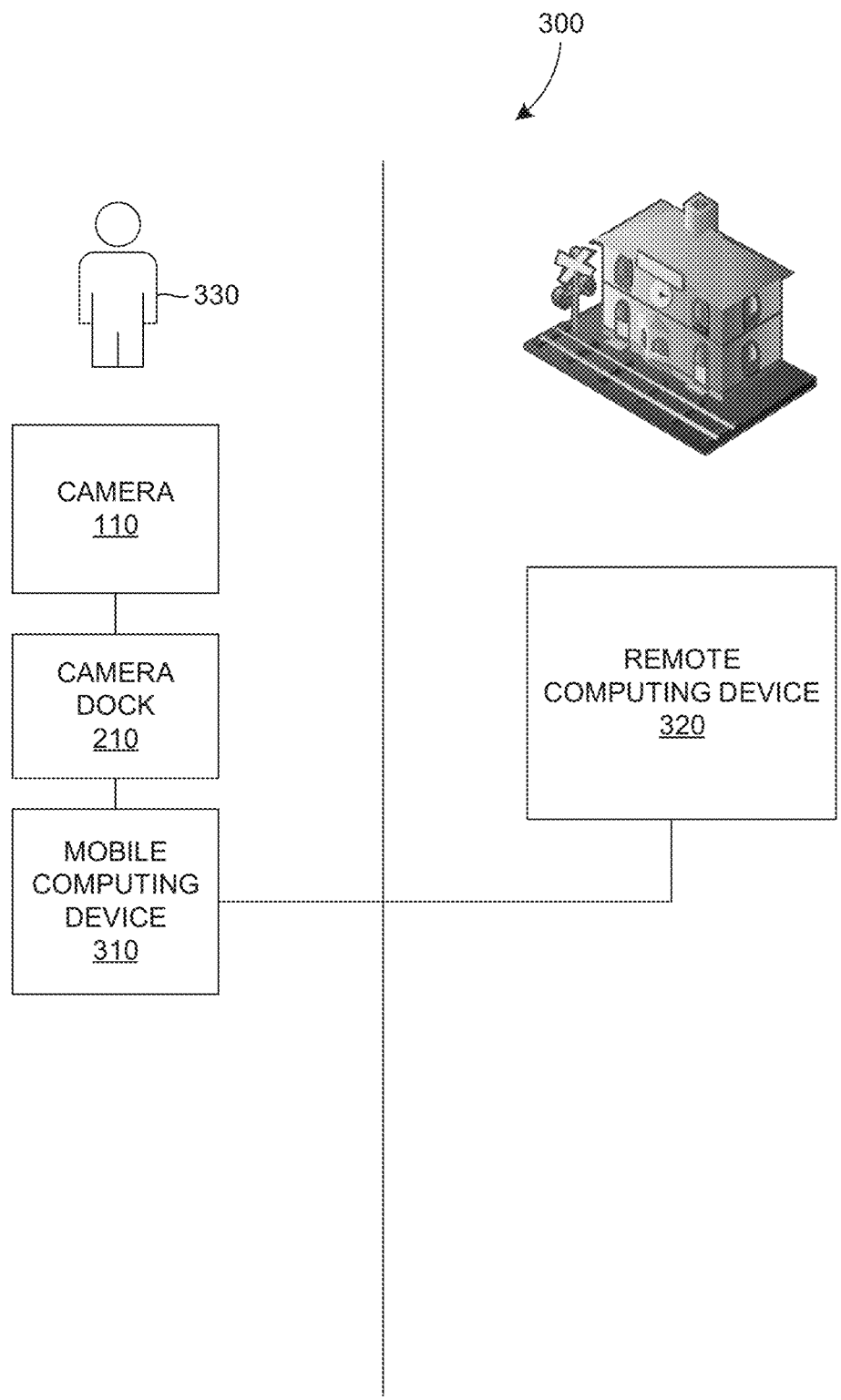
FIG. 3 is a system diagram of a system for concurrent data streams and remotely set parameters utilizing the audio and video capture device and system of FIG. 1 according to an embodiment of the present disclosure.

FIG. 3 is a system diagram 300 of a system for concurrent data streams and remotely set parameters utilizing the audio and video capture device and system of FIG. 1 according to an embodiment of the present disclosure. In general, the system may include an individual (officer or scout) 330 at a location that is using the devices of FIGS. 1 and 2, namely, a camera 110, a camera dock 210, and a mobile computing device 310. These devices may be in communicative contact with a remote computing device 320 that be at a local management station. The remote computing device 320 may be configured to monitor some or all of the data being captured by the scouting device 100 as a monitoring device.

The monitoring device 320 can generally include a transceiver (not shown). The transceiver can provide two-way communication with the transceiver of the device as will be discussed in greater detail in FIG. 3. The monitoring device 320 can also have access to a database (not shown). The database can include a memory, which may in turn contain a variety of stored data. The stored data can be in the form of maps, a listing of certain locales, previously saved longitude and latitude of certain locales, etc. The stored data can also include images, such as still images or video images captured by the cameras in the devices. The database can be located on a server that is local to monitoring user, and/or the database can be located remotely (e.g., via so-called "cloud" computing).

The monitoring device 320 can further include an input transducer (not shown), such as a microphone, a keyboard, buttons, or other type. As will be discussed in FIG. 4, the monitoring user can input information into the input transducer, which can transmit that information to output transducer of a device, which can then output that information to the device. Further, the monitoring user may configure specific parameters about the capture of data at the device as will be discussed in greater detail in FIG. 4.

Additionally, the monitoring device 320 can include an output transducer (not shown). While the monitoring device 320 can input information into the input transducer, the output transducer can receive that information from the input transducer, and then output that information to the monitoring user. The output transducer can include a speaker and/or a display (i.e., screen, computer monitor, etc.). The display can display video images on a video feed. For example, the display can display video images gathered by the scout's camera. Thus, the monitoring user can remotely view the area that the device is occupying.

Moreover, the system can further include a communications system that provides communication between the transceiver of the device and the transceiver of the monitoring device. For instance, the communications system can be internet-based, can be a cellular telephone network, can be a wireless network, or can be a satellite communication system, can route information through an Internet cloud-based server, and can be of any suitable type (e.g., 3G, 4G, GSM/GPRSNVi-Fi, LTE, 1009 etc.). Audio data can also be transmitted via conventional telephony (e.g., GSM, CDMA, etc.). The communications system may therefore include a variety of technologies (i.e., internet-based, cellular-based, or satellite-based technologies) along the communications path between the transceiver and the transceiver.

In addition, visual, audio, and other data can be compressed and encoded for transfer over the communications system. For example, video images can be compressed in accordance with a standard such as MPEG-4 or H.264, then transferred over the communications system.

The transceiver of the monitoring device 320 may, accordingly, have a cellular network connection to the communication system. The transceiver of the monitoring device 320 may then have its own cellular network connection to the communication system. These cellular network connections may include any suitable type or specification (e.g., 3G, 4G, LTE, GSM, GPRS, EV-DO, EDGE, HSDPA, or HSPA+). Alternatively, in some embodiments, communication system may have a cellular network connection to transceiver, and may thereafter convert from the cellular network communications protocol to an internet communications protocol, for example, so that communication system may have an internet-based connection to transceiver. The transceiver may also have a wireless network connection to the communication system, such as an 802.11-compliant Wi-Fi connection (compliant with 802.11a, 802.11b, 802.11g, and/or 802.11n). It will be appreciated, however, that other communications systems are also within the scope of the present disclosure.

Parts of the monitoring device 320, such as the transceiver, the database, the input transducer, the output transducer (which may include the display), and the positioning system—may therefore be integrated with each other in a variety of ways. For example, in some configurations, the transceiver, the database, the input transducer, the display, and the positioning system may be incorporated in a personal computer. In other configurations, at least the input transceiver, the input transducer, and the output transducer (which may include the display) may be incorporated in a personal computer or a cellular telephone. In further configurations, the database may, along with the positioning system, be incorporated in a server.

Accordingly, the communications system can provide two-way communication between the monitoring user and the scouting device 100. This communication can occur nearly real-time. In nearly real-time communication, data (such as video images gathered by the camera or other data input to the input transducer) may be transmitted directly after being gathered by the scouting devices 100, may be streamed through the communication system, and may be received by the monitoring device 320 and directly displayed on display and/or stored in memory. Such streaming may minimize the latency between the gathering of video images by the device and the viewing of the video images at the monitoring device.

As will be discussed in greater detail, the scout can gather visual data via the camera 110 to be transmitted and displayed on the display of the monitoring device 320. Also, the scout can input other information (e.g., audible information, textual information, etc.) via the input transducer, and this information can be output to the monitor via the output transducer. It will be appreciated that information input by the scouting device 100 can be translated and output to the monitoring device 320 in a different form, such as in a text-to-speech transmission, a speech-to-text transmission, etc.

Likewise, the monitoring device 320 can input information (e.g., audible information, textual information, etc.) via the input transducer, and this information can be output to the scouting device 100 via the output transducer. It will be appreciated that information input by the monitoring device 320 can be translated and output to the scouting device 100 in a different form, such as in a text-to-speech transmission, a speech-to-text transmission, etc.

Figure 4:
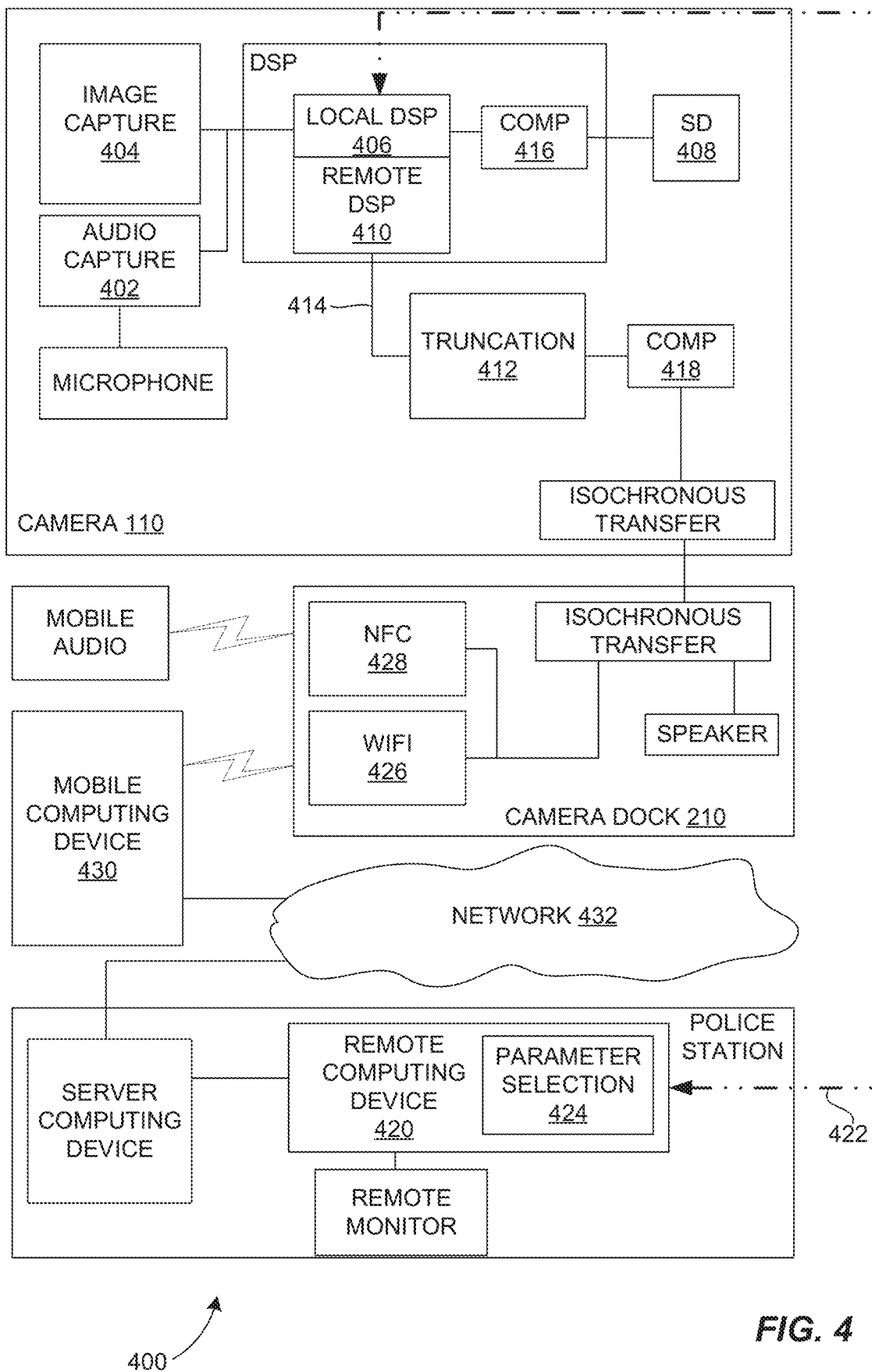
FIG. 4 is a block diagram of a system for concurrent data streams and remotely set parameters utilizing the audio and video capture device and system of FIG. 1 according to an embodiment of the present disclosure.

FIG. 4 is a block diagram 400 of a system for concurrent data streams and remotely set parameters utilizing the audio and video capture device and system of FIG. 1 according to an embodiment of the present disclosure. The system includes a camera device 110, a camera dock 210, a local computing device and a remote computing device 320. The camera 110 may include functionality for capturing audio 402 and video 404 at a high definition, such as with high resolution and bit depth. Local digital signal processing (DSP) 406 may store the captured audio and video at a local memory 408 at high resolution and quality through a first data stream. Further remote DSP 410 may truncate 412 a second data stream to be sent to a remote location through one or more communication channels 414 at a different lower definition, such as with low resolution and quality (as represented by the dotted lines where the person having an ordinary skill in the art would understand that the dotted lines are meant to conceptually describe communication between the DSP and the remote computing device). The first data stream and the second data streams may be processed by the compressions algorithms 416 or 418 of the camera device 110 prior to the storage or transmission to the remote location. Further, a remote computing device 420 may be able to send communication signals 422 to the camera device 110 in order to set the parameters 424 of the local stream and the parameters of the network stream.

In this manner, the system provides a dynamic on the fly reconfigurable system from a singular video sensor obtaining concurrent video streams of different frame size, different frame rates (frame per second or FPS) and different compression factors, includes audio tracks covering the individual video selections, permits unparalleled flexibility to compensate for wireless conditions, remote requests and other ad hoc functions.

Concurrent stream processing to achieve the following:
Video sampled 1280×720 HD stream at 30 fps
H.264 encoded video & AMR encoded audio
Written to SD with time demarcations
Video reduced frame & variable sampled stream by command of remote control
Variable H.264 encoded video & AMR encoded audio with time demarcations
Isochronously transferred to smart phone or the camera dock 210 for RTSP/RTP transfer to server delivery satisfying bandwidth available by monitoring QoS and dynamically adjusting stream parameters.
Transport remotely requested individual pictures or HD demarcated SD content under bulk transfer format to server and requested destination
Separate bidirectional communication audio track in both cellular or IP connection technology is available for BT routing to other radios used with PD's.

The Camera body contains the 1MP (optional 2MP) camera, Omnivision and an OV 9712 image sensor will be used. This will satisfy 720P video. There will be two (2) circuits for video/audio: One circuit will store 720P (1280× 720) @30 fps continually into 32GB/64GB/128GB SD card in loop store mode in H.264 compressed format that will provide access to video/audio files to transfer out dynamically (details associated with Wi-Fi transmitter below) and a path to transmitter will be available for dynamic transfer as is the case with second circuit. Second circuit will parse the (1280×720) from camera above and compress H.264 video in CIF (352×288) or other applicable frame sizes, command control for H.264 and required fps is 1,3,5,10,15,30 and includes a singular pictures in JPEG format as requested by commands from controller. All other parameters of camera are under a command control. This will be fed to 802.11 b/g/n transmitter in dock station. Audio associated with camera can be compressed and packaged with video, microphone & speaker needs to be accessible to Bluetooth transmitter in the dock system. A path to transmitter of video/audio data should be either optical cable or serial USB link The camera needs to support a way where we can change the parameters like resolution, bit rate and FPS on the fly. These parameters, on being changed, may affect the current video being streamed without stopping and restarting. There should also not be any significant delay between changing these parameters and the start of video with new parameters. Power to the camera system may be provided by two wires from dock station 210. Inside of camera system, there may be a "super capacitor 0.25 Farad or as required" to provide some backup power on disconnect from the dock station 210. As Li-Ion battery (not shown) has limited number of charge/discharge cycles, the dock station 210 may have a provision for charging Li-Ion polymer batteries through mini USB connector. Video data can be downloaded from camera module (not shown) while connected to PC with USB A & 4 Band Analog connector with assistance of mode PB on camera module. Video files on SD card 408 will not be accessible without proper login using user name and password on PC, as it contains confidential and privileged information. The dock station 210 may have also female USB A connector that will allow a smart phone 430 to charge when required by using the phone charging cord. Li-Ion batteries in the dock station 210 may be for sustaining operation of camera module and WiFi module 426 or near field communications (NFC) module 428. Alternatively, Bluetooth module (not shown) may communicate for minimum 12 hours of continual use with suggested capacity of 4,000 mAh (300 mA times 12 hours). For additional requirement for phone charging, additional 2,500 mAh is required, so total 6,500 mAh is required.

In an embodiment, the camera module 110 may contain encryption firmware that encrypts the video data in case the live data stream is lost. The encryption can be done in the following scheme:

1. Security Engine

AES, DES, 3DES, and RSA encryption/decryption algorithms implemented by hardware Hash digest tamper proofing implemented by hardware Integrated 512-bit OTP storage space and hardware random number generator 2. The cipher module supports data encryption and decryption by following the data encryption standard (DES), 3DES, or advanced encryption standard (AES) algorithm. The DES, 3DES, and AES algorithms are implemented according to FIPS46-3 and FIPS 197 standards. The DES/3DES and AES operating modes comply with FIPS-81 and NIST special 800-38a standards. The cipher module can encrypt or decrypt a large amount of data effectively. In addition, it encrypts and decrypts one or more blocks at one time.

3. The cipher module has the following features:

Supports the AES key length of 128 bits, 192 bit, or 256 bits. If keys are configured by the key management module, the key length can be set only to 128 bits.

Supports the DES key length of 64 bits. The values for bit 0, bit 8, bit 16, bit 24, bit 32, bit 40, bit 48, and bit 56 represent the parity check values for eight bytes respectively.

4. The parity check values are not used during encryption or decryption.

Supports 3-key and 2-key modes for the 3DES algorithm. If keys are configured by the key management module, only the 2-key mode is supported.

Supports the operating modes of electronic codebook (ECB), cipher block chaining (CBC), 1-/8-/128-cipher feedback (CFB), 128-output feedback (OFB), and counter (CTR) for the AES algorithm. These operating modes comply with the NIST special 800-38a standard.

Supports the operating modes of ECB, CBC, 1-/8-/64-CFB, and 148464-OFB for the DES or 3DES algorithm. These operating modes comply with the FIPS-81 standard.

Encrypts and decrypts one or more blocks at one time in ECB, CBC, CFB, OFB or CTR operating mode.

Encrypts and decrypts one or more blocks at one time in CTR operating mode using the AES algorithm.

Provides eight encryption/decryption keys (64 bits, 128 bits, 192 bits, or 256 bits) configured by the CPU.

5. Provides eight keys (fixed at 128 bits) configured by the key management module. The master CPU supports the write operation but not the read operation.

Provides a single-block encryption/decryption channel and seven multi-block encryption/decryption channels. The single-block encryption/decryption channel can encrypt or decrypt a single block only at one time. In this case, the CPU writes data to the channel register and reads the results. For the multi-block encryption/decryption channel, the logic reads data from the DDR, and writes the encrypted or decrypted data to the DDR automatically.

Supports weighted round robin policy for each channel. For a single-block channel, the weighted value is 1 by default; for a multi-block channel, the weighted value is configurable.

Supports the same set of keys or different sets of keys for any channel.

Keeps the data in the last incomplete block unprocessed when the data of the multi-block channels is not an integral multiple of encryption/decryption blocks.

Supports data combination for multi-block channels. To be specific, if the remaining data in a linked list data block is insufficient to form an encryption/decryption block and the data block is not the last one to be processed, the remaining data is combined with the data in the next data block for encryption or decryption. This avoids data stuffing.

Supports byte address for the multi-block encryption/decryption channel.

Supports the multi-linked-list structure for the multi-block encryption/decryption channel and supports the combination of data from multiple linked lists. The linked list length is 20 bits. That is, the maximum data amount is 1 MB minus 1.

Queries the interrupt status and masks and clears interrupts.

Separately processes and controls interrupts for each channel.

Supports multi-packet interrupts and aging interrupts.

Commands to control parameters of the scouting device 100 may include commands that are sent from phone app of the mobile computing device 430 to camera (or dock station) or from the network 432. The commands are provided to configure/stop/start video streaming and followings are the examples of commands:

Rotate Video (param: degree)—This command may rotate the video by the degrees passed as a parameter. The value of degrees will may be entered as 0 or 180 degrees. This command may be sent to the scouting device 100 before starting the video.

Start Video—This command may start the video with the preconfigured parameters.

Stop Video—This command may stop the video.

Picture (param: resolution)—This command may get a snapshot picture of the current video in JPEG format. The resolution of the picture may be specified as a parameter in the command. The camera supports a range of the resolution, and the resolution typically ranges from 352×288 to HD resolution. The resolution of the captured picture may be same as that of the resolution specified in the command parameter. This command may be issued while the video is being recorded. A picture snapshot may be sent to the app in parallel to the video stream being sent.

Focus—This command may focus the lens on the object at the center of the field of vision. This command may adjust the lens to focus on small items (like printed material or small logo or bar code). The object around a distance of half to three feet from the camera lens can be focused. This command may be followed by Picture command, which may be used to take a snapshot picture of the object. This command may be issued while the video is being recorded such that the video's focus also changes accordingly.

Reset Focus—This command may reset the focus so that the camera can go back to the normal mode of operation (the default focus it uses while the video is being recorded).

Resolution (Set/Get)—"Get Resolution" command may return the current resolution. "Set resolution" command should set resolution as the applied value. The resolutions may apply as: 160×120, 176×144, 352×288, 640×480, 1280×720.

Frame rate (fps) (Set/Get)—"Get FrameRate" command may return the current frame rate. "Set FrameRate" command may set the frame rate as the applied value. The frame rates may apply as: 1, 3, 5, 10, 15, 20, 25, and 30. This frame rate (fps) applies only to the video that is being streamed to the application. In one embodiment, the video stored in an SD card may be by default stored as 1280×720 resolution video at 30 fps; however, other rates are possible.

Bit rate (Set/Get)—"Get BitRate" command may return the current bit rate. "Set BitRate" command may set the bit rate as the applied value. The bit rates may apply all values from 50 kbps to 2000 kbps.

Brightness (set/Get)—"Get Brightness" command may return the current brightness of the streaming video. "Set Brightness" command may set the brightness as the applied value.

Contrast (set/Get)—"Get contrast" command may return the current contrast of the streaming video. "Set contrast" command may set the contrast as the applied value.

Configuration Changed—On receiving this command, a camera may start streaming with newly configured parameters. When the video is streaming, the phone app can change the configuration parameters (like resolution, bit rate or frame rate). Once all the relevant parameters are changed, the app may issue the "Configuration changed" command.

Get Stored Video (Start Time Code, End Time Code)—On receiving this command, the camera may return the stored video on an SD card in the agreed format. The video may cover the duration from 'Start time code' to 'End time code.'

Mark Stored Video (Time code, marker name)—This command sets a marker at the given timecode in the video that is stored in SD card. The name of the marker may be stored for later retrieval purposes. As the video is stored in a circular buffer, when the video at the timecode is overwritten, the marker may be deleted.

Get Markers—The video may return a comma separated list of all the markers currently in the system. For instance, if the markers are "marker 1," "marker 2," "marker 3," then this command may return "marker 1, marker 2, marker 3."

Get Marker TimeCode (param: marker name)—This command may return the time code at which the marker of given name is tagged. The parameter of the method is the marker name for which the time code is required.

In addition to commands, events are notifications sent from camera (or dock station) to phone application and they start due to the user action or change in operating environment. They are asynchronous in nature and may be notified to Phone App. The phone may not poll for the events. Instead, the phone app will receive these notifications asynchronously. The followings are the examples of events:

Button click—When the user clicks any one or both the buttons in the dock station, the phone app may be informed immediately. The status parameter may tell which buttons were pressed.

Video Error—When there is an error in the video stream due to power or any other reason, the phone app may be informed immediately. The status parameter may tell which parameters are pressed.

Camera Applications (Real-time facial capture and recognition)—. Facial recognition module is server based software utilizing face detection, regeneration of references, and mesh algorithm network processing illustrated below. Regeneration of references assures right identification of subject under varying conditions.

Remote activation of record—Records are available for remote or local marking identification, and also for remote or local wireless transfer of marked content along with manually generated markers to server storage.

DL scan and process—2D or matrix code readers are widespread on Android & iPhone for most popular 2D code formats. smart phone is integral part of the solution, risk factor of software development is totally mitigated. Wide-angle camera distortion is a singular development item focus.

LP VR recognition and process—The command structure uses VR engine and that along with pictorial snapshot will provide detailed information required for License Plate identification.

Dynamic resolution/FPS management—Command control of configuration is via smart phone and its connection with a server and remote site. Simple hovering of mouse on video frame at the observation platform results in changes to camera action.

Figure 5:
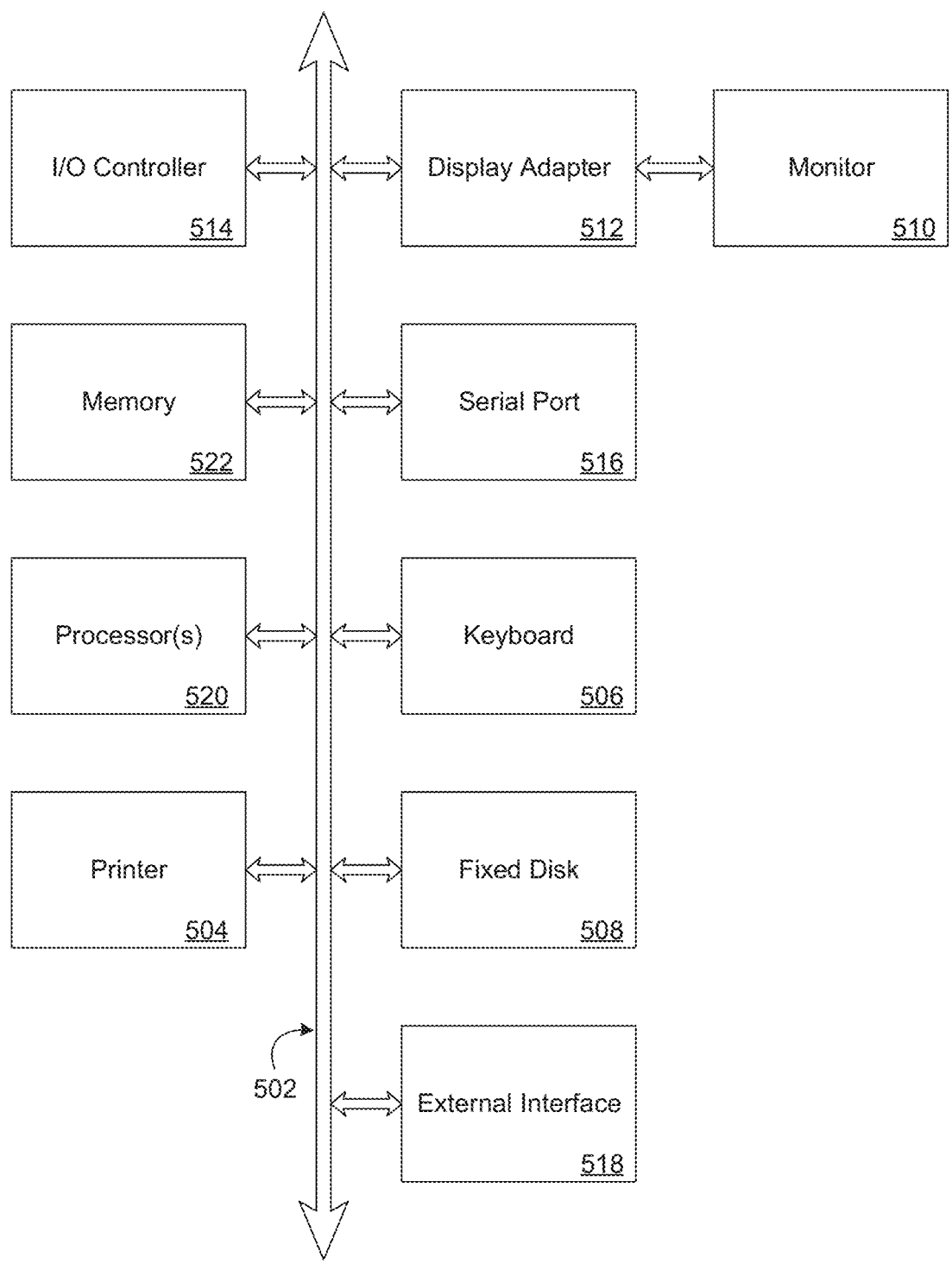
FIG. 5 is an exemplary computing environment that is a suitable representation of any computing device that is part of the audio and video capture device and system of FIG. 1 according to an embodiment of the present disclosure.

FIG. 5 is a diagram 500 illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system.

The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

Figure 6:
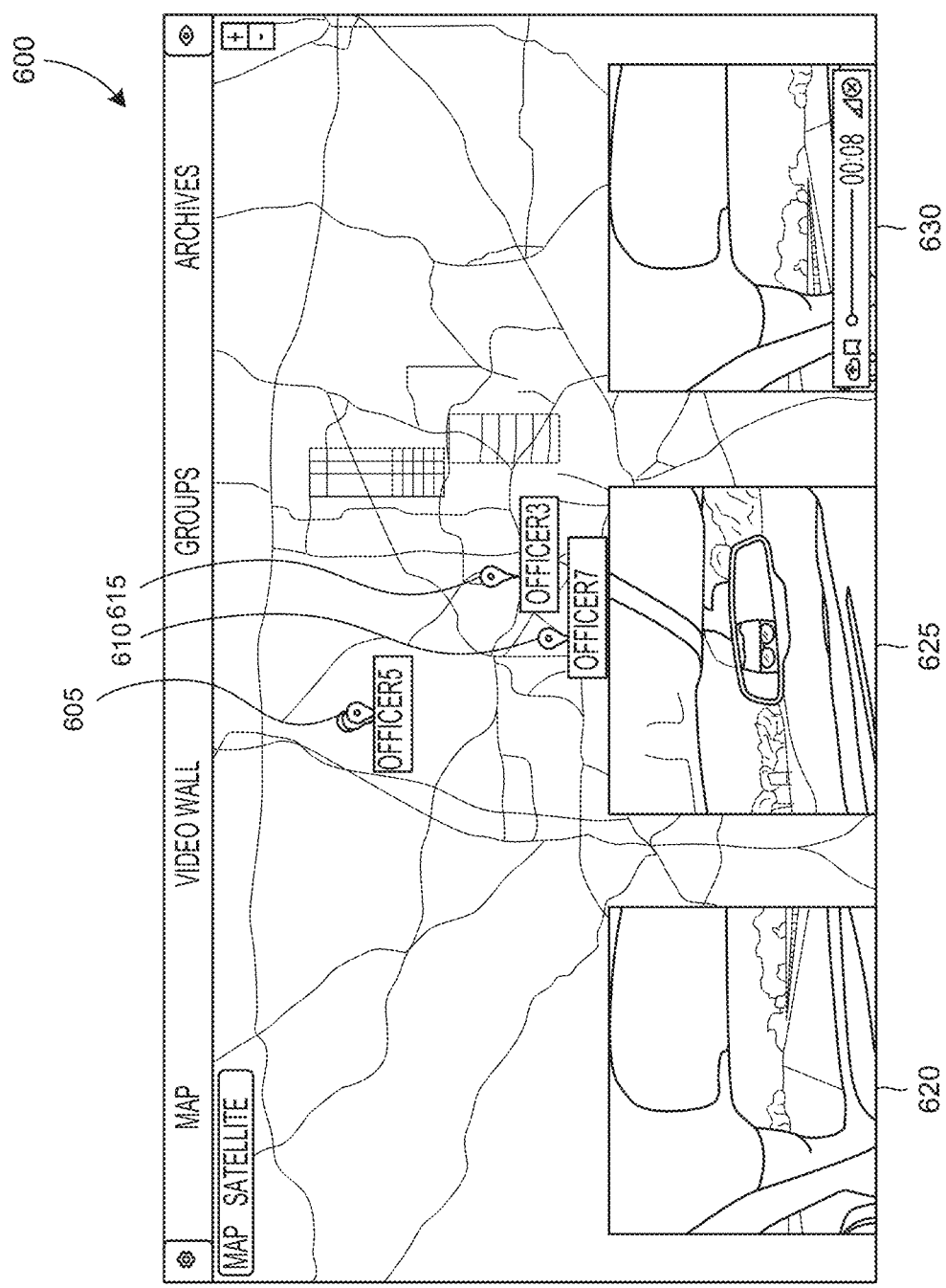
FIG. 6 is a screen shot of a command and control view of a map of three deployed sentries in a given region according to an embodiment of the subject matter disclosed herein.

FIG. 6 is a screen shot 600 of a command and control view of a map of three deployed sentries in a given region according to an embodiment of the subject matter disclosed herein. As discussed above, a user that is located at a remote station may have control over some aspects of a video feed being captured by the device of FIG. 1. Thus, the control user may adjust the resolution and quality of the video feed that is uploaded to the command and control center via cloud-based network elements. In this screen shot, the data being displayed includes map locations of three officers 605, 610, 615 along with video feeds of eth three officers 620, 625, 630. These video feeds may be set to a medium level of quality and resolution while there is little interest in what is being recorded. If an interesting situation arises where the control user wishes to see a more detailed feed from one or more officers, the control user may remotely change the parameters for the uploaded video stream. For example, saying "Alarm" will command the camera module to change the fps or other parameters to obtain the high definition setting. Further, the control user may isolate the video and audio feed of the interesting video feed as shown in the screen shot of FIG. 7.

Figure 7:
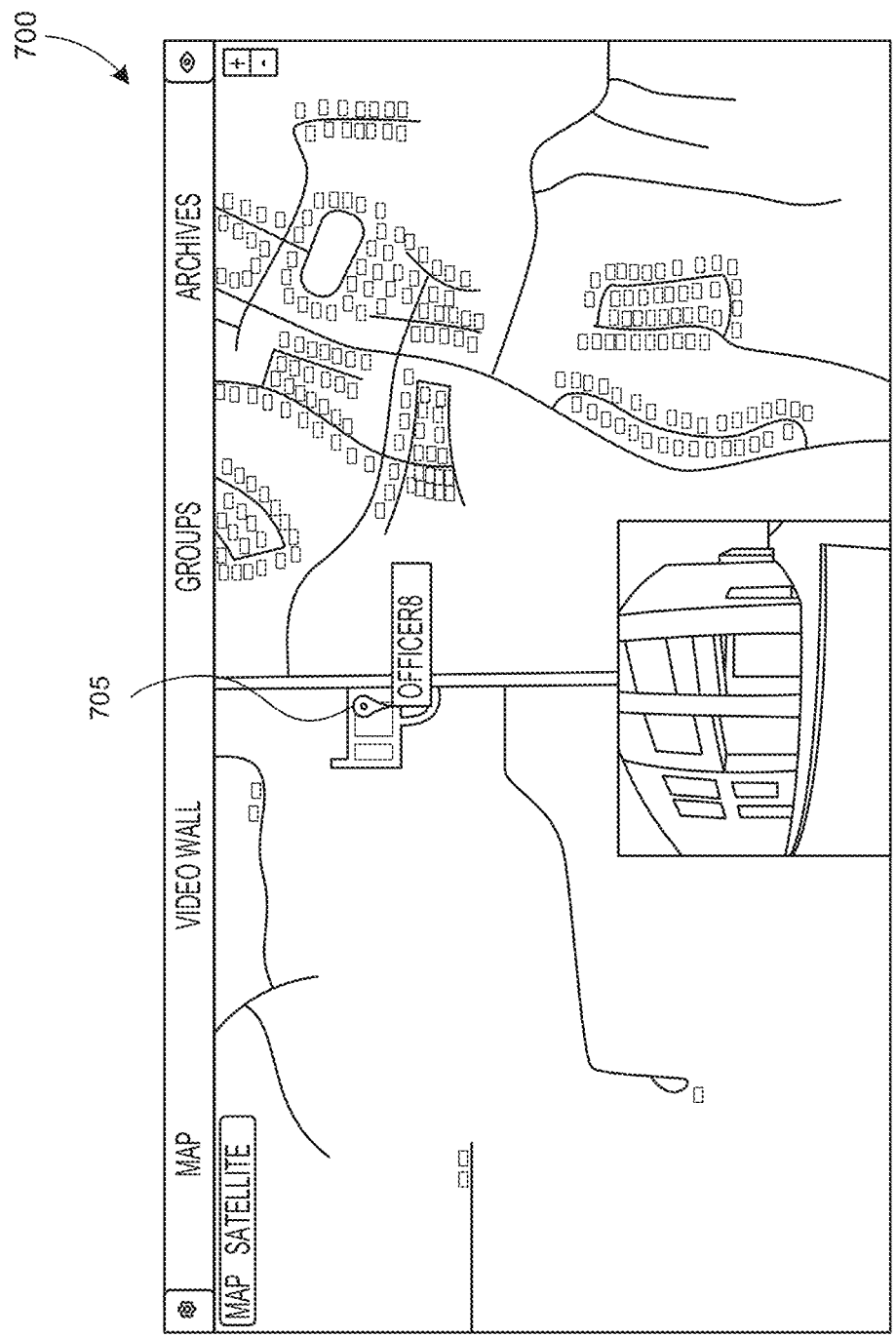
FIG. 7 is a screen shot of a command and control view of a map of a single deployed sentry in a given region according to an embodiment of the subject matter disclosed herein.

FIG. 7 is a screen shot 700 of a command and control view of a map of a single deployed sentry 705 in a given region according to an embodiment of the subject matter disclosed herein. In such a situation, the control user may also receive an audio feed in real-time of the officers recorded audio and video. As before, the control user may adjust the uploaded feed according to desired signal quality and resolution.

Figure 8:
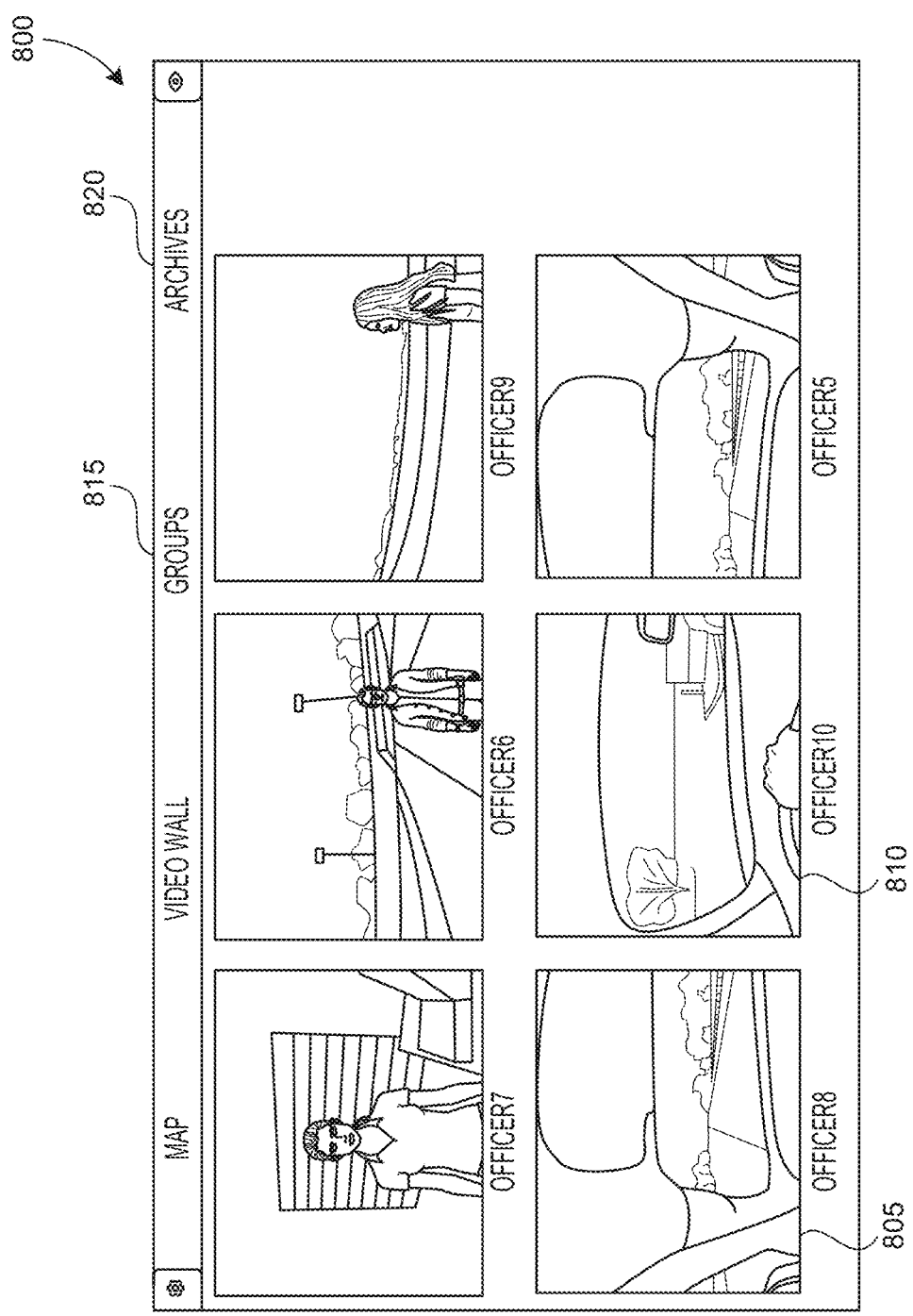
FIG. 8 is a screen shot of a command and control view of a video feed wall of deployed sentries according to an embodiment of the subject matter disclosed herein.

FIG. 8 is a screen shot 800 of a command and control view of a video feed wall of deployed sentries according to an embodiment of the subject matter disclosed herein. As shown, the control user may also view several video feeds 805, 810 on a single display without map or location data being displayed. This so-called video wall displays all streaming users with muted sound. Additional aspects of this view include "Groups" 815 that is an administration panel, whereby a control user may enter selection of a sentry and view various attributes (e.g., click on SAIRAM and a list of users appears). The upper right corner here includes shortcuts to administrative control shown as Archives 820. Selecting Archives 820 for a given user name generates a list; selecting from this list allows view of archives of said user. Clicking on video frame will start that video clip and allows editing tags and upload requests.

For example, if you click on 'Officer10' 805 and 'Officer8' 810 on MAP, you can see the latitudinal and longitudinal position and the location may get updated as the video progresses.

The user may access videos of specific groups. The selection examples are following:

username:police (The user can see all SWAT 1, MOTO PATROL, CRUISE PATROL. The user may also have admin rights=and can see groups screen).

username:motopolice (The user can see MOTO PATROL only The user may not have admin rights, and therefore the user cannot see groups screen).

username:swatpolice (The user can see SWAT 1 only. The user may not have admin rightsand the user cannot see groups screen).

username:Officer1, Officer2 . . . etc. (The user can see their videos only. They may not have admin rights=and they cannot see groups screen).

Figure 9:
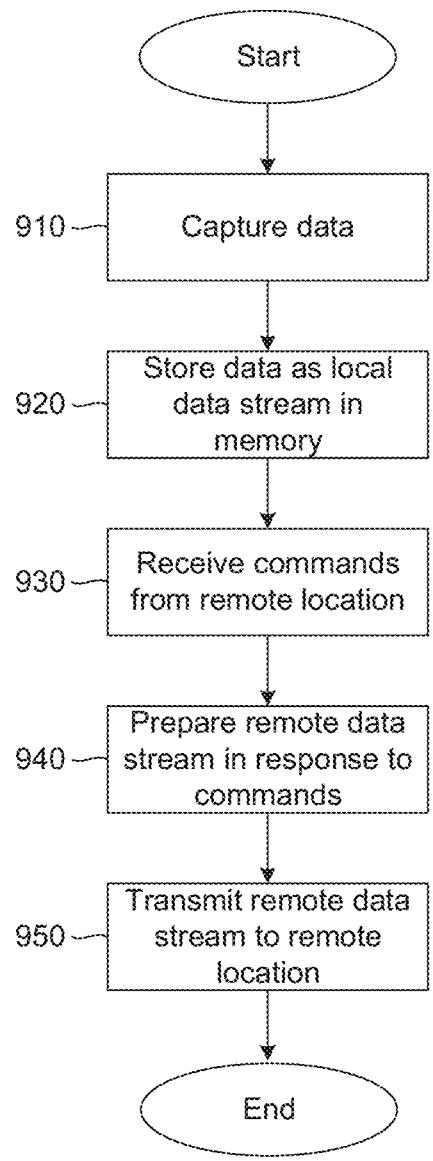
FIG. 9 is a flow diagram of a computer algorithm and method for monitoring real-time data streams with different qualities according to an embodiment of the subject matter disclosed herein.

FIG. 9 is a flow diagram 900 of a computer algorithm and method for monitoring real-time data streams with different qualities according to an embodiment of the subject matter disclosed herein. When an officer is on site for duty and uses a monitoring device, the officer can start capturing image (video or still) and audio data (step 910). The captured data may be stored real-time with a local storage memory such that the data can be accessed later for review or simultaneously by the officer or other officers (step 920). The captured data may also be streamed to a remote location simultaneously. In case a user at the remote location is monitoring the data stream, the user at the remote location may send commands, including parameters to define the data stream for remote streaming (step 930). In response to the commands, the remote data stream is prepared for remote streaming (step 940). The remote data stream is then transmitted back to the remote location (step 950).

Figure 10:
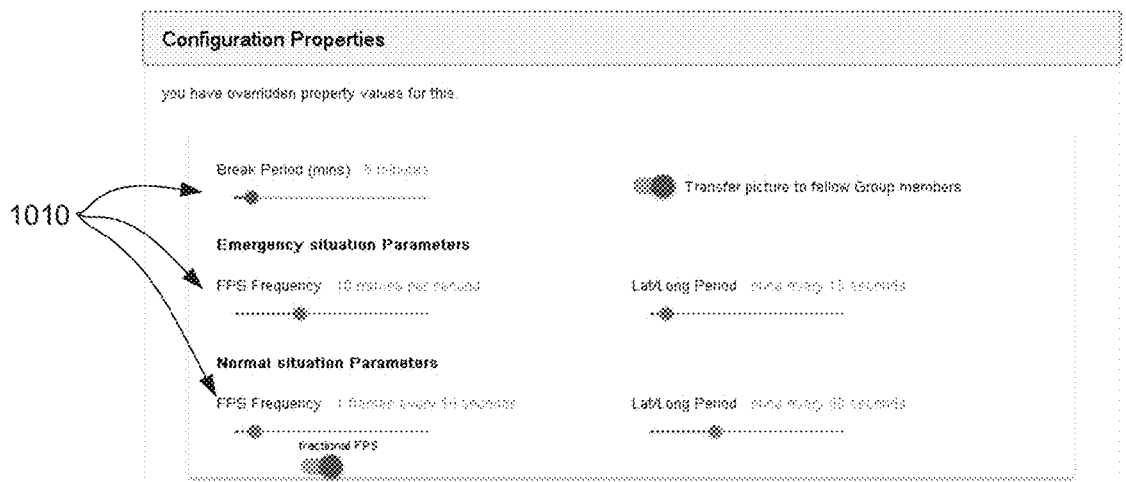
FIG. 10 is a screen shot of an exemplary control interface for setting parameters for one or more remote camera systems according to an embodiment of the subject matter disclosed herein.

FIG. 10 is an exemplary control interface for setting parameters for cameras according to an embodiment of the subject matter disclosed herein. The remote computing device 420 may be able to adjust the parameters 1010 of the local stream and network stream by through computer entry or through passing a mouse pointer over the screen. For example, if a monitoring user at the remote computing device identifies that the situation through the video image involves emergency, then the change to the fps of the video image can be easily changed by sliding the mouse pointer from the left to the right to change the fps, such as 1 fps to 30 fps. As such, a remote monitoring user can establish specific video recording and video transmission parameters of one or more remote devices. Then, each remote device may simultaneously record high-definition data to a local memory while also simultaneously transmitting the high-definition data to a remote monitoring station along with low-definition data that can used at other devices and remote monitoring stations.

Additionally, the camera settings may be controlled by a number of different scenarios as well. Some examples include: remote observation post that monitors "Situational Awareness Screen" through computer entry or through passing mouse pointer over video frame; low fps video changes to full fps by pointer being detected on "Situational Awareness Screens" (example: if default requirement is 1 fps, mouse pointer will force camera to go full 30 fps for duration when mouse pointer hover over the video frame). See default conditions of officer 7 in configuration properties attachment, officer wearing the camera module can give a voice command to change parameter changes, and automatic adjustments directed by the QoS software monitoring radio frequency conditions from server point of view.

Figure 11:
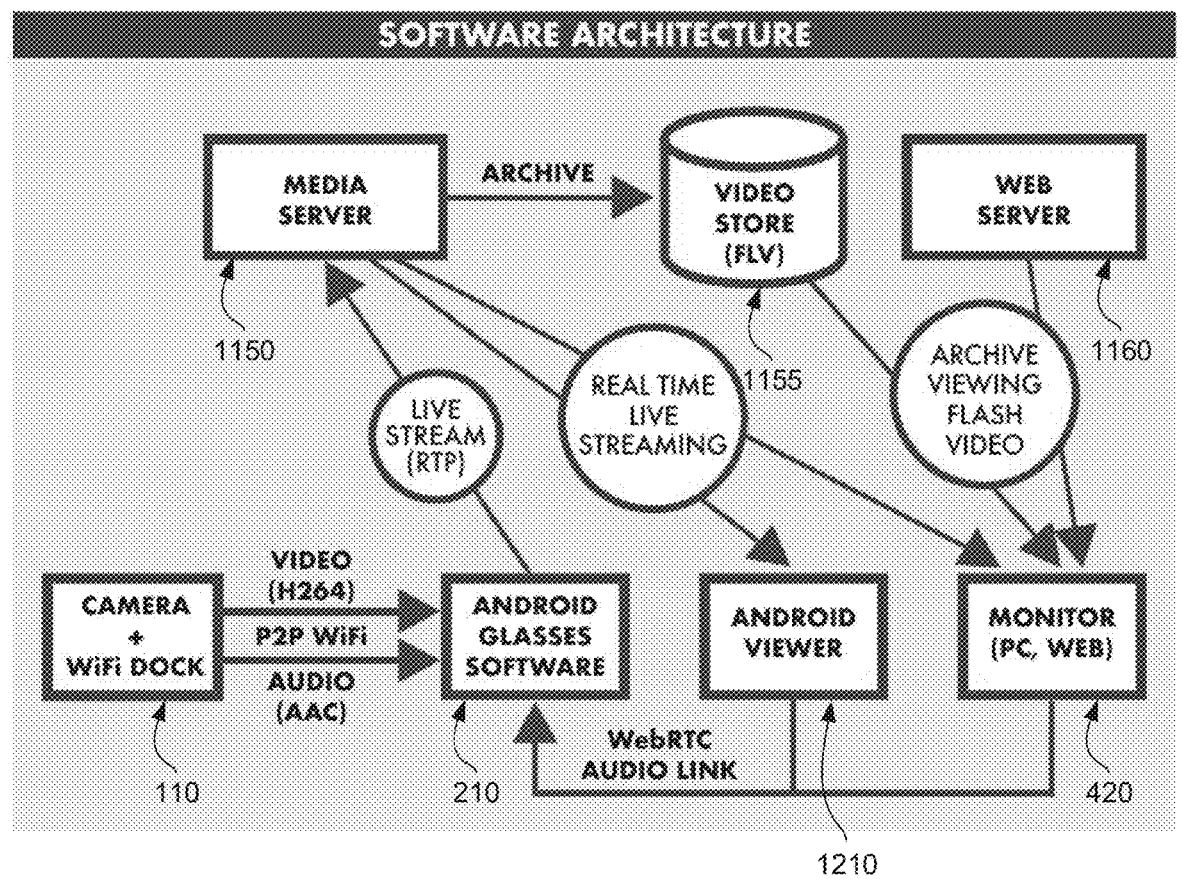
FIG. 11 is a block diagram showing an exemplary software architecture of the back-end software services supporting the camera and dock station of FIG. 5 according to an embodiment of the subject matter disclosed herein.

FIG. 11 is a block diagram showing an exemplary software architecture of the back-end software services supporting the camera and dock station of FIG. 4 according to an embodiment of the subject matter disclosed herein. Here, the various data collection from the camera device 110 can be shared at a first architecture level at a remote docking station 210 that may include a remote viewing application 1210 (such as an Android Viewer). The remote monitor station 420 is also part of the level of software architecture. With this first level interface, a number of software components may support the interaction of A/V data in this software architecture platform including a media server 1150 to support a live stream using Real-Time Transport Protocol (RTP) to any device in the first level, a video-store 1155 for longer-term storage and archiving, and a web server 1160 for providing duplicate streams and archive streams to additional devices and components (not shown) in the platform.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. An audio/video (A/V) capture device, comprising:
an input capture module configured to capture A/V data;
a local processor coupled to the input capture module, the local processor configured to manipulate the captured A/V data to be in condition for transmitting to a remote computing device at a selectable variable rate, wherein the selectable variable rate comprises at least a first variable rate that is high-definition and a second variable rate that is low-definition; and
a communication module coupled to the local processor and configured to transmit the captured NV data at the high-definition rate to the remote computing device through a computer network concurrent with the capture of the A/V data, wherein the high-definition variable rate is selected by a communication received by the local processor from the remote computing device to the exclusion of the low-definition variable rate such that only the captured A/V data associated with the high-definition variable rate is transmitted to the remote computing device.

2. The device of claim 1, wherein the local processor is further configured to store the captured A/V data at a first variable rate in a local memory.

3. The device of claim 2, wherein the local processor is further configured to manipulate the captured A/V data stored at the first variable rate into a data stream at a second variable rate for sending to the remote computing device.

4. The device of claim 2, wherein the captured A/V data stored at the first variable rate is compressed prior to the storage in the local memory.

5. The device of claim 1, wherein the A/V capture device further comprises a video camera having an audio capture component.

6. The device of claim 1, wherein the input capture module is coupled to at least one of a microphone and a keyboard.

7. The device of claim 1, wherein the communication module is further configured to transmit the captured A/V data though an isochronous data transfer.

8. A system, comprising:
an audio/video (A/V) capture device, the A/V capture device including:
an input capture module configured to capture A/V data;
a local processor coupled to the input capture module and configured to store the captured A/V data in a local memory and to manipulate the captured A/V data to be in condition for transmitting at a selectable variable rate, wherein the selectable variable rate comprises at least a first variable rate that is high-definition and a second variable rate that is low-definition; and
a communication module coupled to the processor and configured to transmit the manipulated captured A/V data at the high-definition rate concurrent with the capture; and
a remote computing device communicatively coupled to the A/V capture device and configured to select the selectable variable rate and to receive the manipulated captured A/V data transmitted at the selected variable rate to the exclusion of other selectable variable rates such that only the captured A/V data associated with the selected variable rate is transmitted to the remote computing device.

9. The system of claim 8, wherein the A/V capture device is further coupled to a docking station configured to facilitate communication between the A/V capture device and the remote computing device.

10. The system of claim 9, wherein the communication is facilitated though at least one of: a near-field communication link; a Wi-Fi-enabled communication link, an isochronous wired communication link; and a FireWire-enabled wired communication link.

11. The system of claim 9, further comprising an isochronous communication link coupled between the docking station and the A/V capture device.

12. The system of claim 9, wherein the docking station further comprises a battery configured to supply power to the A/V capture device.

13. The system of claim 9, wherein the docking station further comprises a speaker configured to output an audio portion of the captured A/V data.

14. The system of claim 9, wherein the docking station further comprises a communication module configured to communicate with at least the remote computing device.

15. The system of claim 8, wherein the remote computing device is further configured to concurrently receive the captured A/V data stored in the local memory at a first variable rate with the manipulated captured A/V data transmitted at the selected variable rate.

16. The system of claim 8, wherein setting the variable rate further comprises setting at least one of a video resolution setting, a video signal bit rate setting, and a video frames per second setting.

17. A method, comprising:
dynamically capturing audio/video (A/V) data by a monitoring device;
storing the captured A/V data in a local memory;
remotely setting at least one A/V data parameter corresponding to a high-definition video rate;
manipulating the captured A/V data according to the remotely set parameter; and
transmitting the manipulated captured A/V data to a remote computing device concurrent with the capture at the high-definition video rate to the exclusion of any other variable rate such that only the captured A/V data associated with the remotely-set variable rate is transmitted to the remote computing device.

18. The method of claim 17, further comprising communicating a change in the A/V data parameter to the monitoring device; and changing the manipulation of the captured A/V data in response to the changed A/V data parameter.

19. The method of claim 17, further comprising communicating a stop command to the monitoring device; and stopping the manipulation of the captured A/V data in response to the changed A/V data parameter.

* * * * *

UNITED STATES PATENT AND TRADEMARK OFFICE
CERTIFICATE OF CORRECTION

PATENT NO. : 11,064,226 B2  
APPLICATION NO. : 15/922614  
DATED : July 13, 2021  
INVENTOR(S) : Milan Slamka Page 1 of 1

It is certified that error appears in the above-identified patent and that said Letters Patent is hereby corrected as shown below:

In the Claims

Column 16: Claim 1, Line 4: Please replace "(NV)" with "(A/V)"

Signed and Sealed this  
Thirteenth Day of September, 2022

Katherine Kelly Vidal  
*Director of the United States Patent and Trademark Office*